United States Patent Office 3,044,976
Patented July 17, 1962

3,044,976
PROCESS FOR MAKING RUBBER-BASE ADHESIVE CONTAINING PREFORMED PHENOLIC RESIN-ALKALINE EARTH METAL SALT
John G. Brooks, East Petersburg, and George W. Koehn, Columbia, Pa., assignors to Armstrong Cork Company, Lancaster, Pa., a corporation of Pennsylvania
No Drawing. Filed Nov. 15, 1954, Ser. No. 469,020
12 Claims. (Cl. 260—32.8)

This invention relates to adhesives, and more particularly to rubber-base adhesives. Still more particularly, the invention relates to solvent type rubber-base adhesive compositions having an unusual combination of properties such as long tack range, high immediate bonding strength, unusual heat resistance, and excellent can stability; can stability means that the properties of the adhesive do not change appreciably on aging.

Rubber-base adhesives have been known to the art for a number of years. Such adhesives have been widely used as industrial adhesives. However, although the rubber-base adhesives of the prior art are possessed of a number of outstanding characteristics, they do not combine, among other things, the properties of good heat resistance coupled with good can stability. Can stability is an important property of adhesives, since it is necessary that the adhesives remain in the same condition as packaged over varying periods of time; this necessitates that there be no aging or changing in the adhesive once it has been placed in the marketing package. To some extent, the can stability problem has been overcome by allowing the adhesive to pass through an aging period prior to the time the adhesive is packaged. Although such treatment is generally satisfactory, it demands an undue amount of handling and time consumption in the manufacture of adhesives.

It is the primary object of the present invention to present a process of making a solvent type rubber-base adhesive composition which exhibits an unusual degree of heat resistance and can stability. It is a further object of the present invention to present a process whereby the need for subjecting a solvent type rubber-base adhesive composition to an aging period is eliminated.

These objects have been accomplished in a surprisingly effective and straightforward manner. The invention contemplates reacting a phenolic resin with sufficient alkaline earth metal oxide to form a resin-alkaline earth metal salt having at least an elevated melting point as compared with the original resin and preferably a decomposition point instead of a melting point. This resin salt is then blended with a compatible rubber polymer, usually free from sulfur and compounds capable of decomposing to yield vulcanization accelerators. Solvents necessary to make up the adhesive composition having a solids content of from about 15% to about 45% by weight may be added at any convenient point during the process.

The phenolic resins contemplated for use in the present process are those which are reactable with an alkaline earth metal oxide to form salts. As examples of such resins, there may be mentioned the phenolic resins such as butyl phenol-formaldehyde resin, terpene phenolic resins, and the like. Some of these resins are sold by the Schenectady Varnish Company under various designations, as for example, SP-12T, SP-12D, and SP-125D. Exemplary of the terpene phenolics is the resin sold under the name "Durez 240." It should be noted that resins which do not react with alkaline earth metal oxide are outside the scope of the present invention. Exemplary of such nonreactive resins are the cumars, terpenes, and polystyrenes. A simple test as to whether or not a given resin is reactable with an alkaline earth metal oxide is to contact the resin and oxide under reaction conditions and note if there has been an increase in the melting point of the resin. If the melting point has been increased, then the resin is reactable with the alkaline earth metal oxide. It is postulated that only those resins possessing a phenolic OH group are reactable with an alkaline earth metal oxide to produce a resin salt having an elevated melting point.

The various phenolic resins falling within the scope of the present invention will react with varying amounts of alkaline earth metal oxide. In each case, however, the resin to be used must be reacted with sufficient alkaline earth metal oxide to raise the melting point of the resin at least about 25° Fahrenheit and preferably to destroy the melting point of the resin; that is, the final resin-alkaline earth metal salt should preferably have a decomposition point as opposed to a true melting point. Generally speaking, as more and more of the alkaline earth metal oxide reacts with the resin, the melting point of the reaction product increases. Not until the melting point has been raised at least about 25° F. and preferably disappears and is replaced by a decomposition point does the resin salt meet the requirements of the present process. Another way to define the resin salt is that the resin must react with all the oxide with which it is capable of reacting. In most cases this will produce a resin having a decomposition point. With a few resins like the terpene phenolics, however, there will be produced a resin simply having a melting point elevated between about 25°–75° F. It has been found that the use of a resin salt having an elevated melting point and preferably a decomposition point instead of a melting point is the critical factor in imparting increased can stability to the final product. To the extent that the resin is not reacted with all the alkaline earth metal oxide with which it is able to react, the final product possesses decreased can stability and lower heat resistance.

The resin may be reacted with the alkaline earth metal oxide in any convenient manner. It is preferred, however, to mix the resin with a suitable solvent and then add the requisite amount of alkaline earth metal oxide. The reaction of the resin and the alkaline earth metal oxide is straightforward. The rate of reaction may be enhanced by increasing the temperature of the reaction mixture. If desired, the temperature may be raised to the point where the solvent commences to boil off; in this case, a reflux condenser should be used to return solvents to the reaction mixture. Unreacted oxide may be filtered off if desired once no further increase in melting point is noted or once the melting point is replaced by a decomposition point.

It must be emphasized that the alkaline earth metal oxide is reacted with the resin and not admixed with the rubber.

The term "alkaline earth metal oxide" is intended to include magnesium oxide in any of its forms. In fact, magnesium oxide is the preferred alkaline earth metal oxide.

The compatible rubber used in the process of the present invention may be utilized either alone or in combination with other types or grades of rubber. Neoprenes, butadiene-acrylonitrile copolymer rubbers, butadiene-styrene copolymer rubbers, natural rubber, and the like, or mixtures thereof may be used. Desirable properties are obtained by utilizing as a plasticizer neoprene Type W. Neoprene W is described as a nonsulfur modified general purpose type of neoprene. It is made by the emulsion polymerization of chloroprene and has a uniform molecular structure but does not contain sulfur, thiuram disulfide, or other compounds capable of decomposing to yield either free sulfur or a vulcanization accelerator. It has a specific gravity of 1.23 and is readily soluble in aromatic and chlorinated hydrocarbon, naphthenic petroleum solvent, and is partially soluble in esters and ketones. The material is insoluble in water and alcohol. It is known as a stabilized chloroprene polymer which is free from sulfur and compounds capable of decomposing to liberate free sulfur or form vulcanization accelerators. In the practice of this invention, this material may be used alone or in combination with other neoprenes, such as neoprene Type AC. This latter rubber may be used alone if desired. Type AC is obtained by emulsion polymerization of chloroprene and is known as a nonsulfur modified chloroprene polymer stabilized by a thiuram disulfide. It has a specific gravity of 1.23. It is readily soluble in aromatic hydrocarbons such as toluene, chlorinated compounds such as carbon tetrachloride, and certain ketones such as methyl ethyl ketone. It is insoluble in aliphatic hydrocarbons, water, alcohol, and acetone.

Other rubbers suitable for use in the present process are those rubbers compatible with the resin salt as Buna N, natural rubber, and GR-S.

As solvents, there may be employed those solvents generally known, for example, methyl ethyl ketone, toluol, ethyl acetate, and diluents such as naphtha or various petroleum fractions. However, it is preferred to employ a solvent which is a mixture of an ester or ketone such as methyl ethyl ketone, ethyl acetate, and the like, and a hydrocarbon solvent, for example, toluol and petroleum fractions.

Various fillers may be employed in the process of the present invention. Such fillers as magnesium oxide, calcium oxide, carbon black, clays, and the like are all suitable. It must be pointed out that the alkaline earth metal oxide may serve a dual role in the present process. First of all, the alkaline earth metal oxide may serve as the reactant for forming the above-described resin salt. Secondly, the same alkaline earth metal oxide may also serve the role of ordinary filler. Thus there can be reacted with a resin sufficient magnesium oxide to form a resin salt having a decomposition point and then additional magnesium oxide may be employed as a filler. Those amounts of alkaline earth metal oxide in excess of that reacted with the resin are considered filler. Often it will be found desirable to add a filler different from the alkaline earth metal oxide reacted with the resin. A particularly desirable filler for use in the production of the adhesive of the present invention is the material known as "Hi-Sil," which is a hydrated silica of extremely fine ultimate particle size, the average particle size being 0.022 micron. Such fillers may be milled into the rubber composition prior to the addition of the resin salt.

In accordance with a preferred embodiment of the present invention, the phenolic resin may be added to a portion of the solvent to be used and the alkaline earth metal oxide added thereto. On completion of the reaction, the proper quantity of neoprene into which has been milled the desired quantity of filler is added to the resin solution and the whole blended into a homogeneous mass. The remaining solvent may then be added.

The proportion of the phenolic resin salt to 100 parts of the compatible rubber may vary widely so long as compatibility is maintained; this occurs when the salt is present in amounts of between about 5 and about 200 parts, with the preferred proportion being between about 40 and 125 parts.

The amount of alkaline earth metal oxide used to form the resin salt will be determined by the particular phenolic resin used and the quantity of oxide needed to react completely with the resin and to produce a resin having at least an elevated melting point and preferably a decomposition point instead of a melting point in the resin. The amount of filler to be used will be determined by those methods well known in the art. The amount of solvent should be such that the final solids content of the composition is in the range of about 15% to about 45% by weight, although this depends on the end use of the adhesive. As described above, the solvent may be introduced at any desirable point in the process. A portion may be added to the resin prior to the addition of the alkaline earth metal oxide, while the remainder of the solvent may be added after the formation of the resin salt. The milled rubber containing, if desired, a filler may then be added to the solvent-resin salt mixture. It is sometimes preferable to have the total amount of solvent present when the rubber is added in order that solution of the rubber may be expedited. However, it may be desirable to add at least a portion of the solvent at the end of the process in order to adjust the solvent content to the precise concentration desired.

The following examples illustrate the invention:

*Example I*

100 parts by weight of a butyl phenol-formaldehyde resin is dissolved in 200 parts of methyl ethyl ketone, to which has been added 22 parts toluol. To the solution is added 20 parts magnesium oxide and the agitated mixture is allowed to react at room temperature. A thin film of this resin salt solution dries rapidly, whereas a similar solution of the resin itself dries very slowly.

20 parts of magnesium oxide is milled in a rubber mill into 100 parts of neoprene AC, and this stock is dissolved in the resin salt solution. 222 parts of a rubber solvent comprising a petroleum fraction is added to make a total composition containing 35% total solids.

The resulting adhesive composition possesses extraordinary can stability in that no detectable change takes place in the adhesive after formulation.

*Example II*

An adhesive composition of the same materials as in Example I and in the same amounts is prepared in the same manner, save that the 40 parts by weight of magnesium oxide is milled into the neoprene AC. The final composition resulting from this process continues to change after completion of the formulation for a period of 10 days.

We claim:
1. The process of making a solvent type plastic adhesive composition having a solids content of from about 15% to about 45% by weight, which process comprises reacting a butyl phenol-formaldehyde resin reactable with an alkaline earth metal oxide with sufficient alkaline earth metal oxide to form a resin-alkaline earth metal salt, said salt being characterized by having temperature properties falling within the range of a melting point of about 25° F. above the melting point of said resin to the decomposition point of said resin salt, blending said salt with a compatible rubber selected from the group consisting of natural rubbers, butadiene-acrylonitrile copolymer rubbers, butadiene-styrene copolymer rubbers, polychloroprene rubbers, and mixtures thereof, and adjusting the solids content of the composition to form about 15% to about 45% by weight.

2. The process according to claim 1 wherein the reaction is carried out to such an extent that the resin salt is at the decomposition point.

3. The process according to claim 1 wherein said alkaline earth metal oxide is magnesium oxide.

4. The process according to claim 1 wherein said compatible rubber is a chloroprene polymer.

5. The process of making a solvent type plastic adhesive composition which comprises dissolving a butyl phenol-formaldehyde resin reactable with an alkaline earth metal oxide in a solvent therefor, reacting said resin with sufficient alkaline earth metal oxide to form a resin-alkaline earth metal salt, said salt being characterized by having temperature properties falling within the range of a melting point of about 25° F. above the melting point of said resin to the decomposition point of said resin salt, blending a compatible rubber selected from the group consisting of natural rubbers, butadiene-acrylonitrile copolymer rubbers, butadiene-styrene copolymer rubbers, polychloroprene rubbers, and mixtures thereof with said resin salt and solvent, and adjusting the solids content of the composition to from about 15% to about 45% by weight.

6. The process according to claim 5 wherein the reaction is carried out to such an extent that the resin salt is at the decomposition point.

7. The process according to claim 5 wherein said alkaline earth metal oxide is magnesium oxide.

8. The process according to claim 5 wherein said compatible rubber is a chloroprene polymer.

9. The process of making a solvent type plastic adhesive composition which comprises reacting a butyl phenol-formaldehyde resin with sufficient magnesium oxide to form a butyl phenol-formaldehyde resin-magnesium oxide salt having a decomposition point, blending said salt with a compatible rubber selected from the group consisting of natural rubbers, butadiene-acrylonitrile copolymer rubbers, butadiene-styrene copolymer rubbers, polychloroprene rubbers, and mixtures thereof, and adjusting the solids content in a solvent to from about 15% to about 45% by weight.

10. The process according to claim 9 in which said compatible rubber comprises a polychloroprene polymer.

11. The process of making a solvent type plastic adhesive composition having a solids content of from about 15% to about 45% by weight, which process comprises dissolving a butyl phenol-formaldehyde resin in a mixture of methyl ethyl ketone and toluol as a solvent, reacting said resin with sufficient magnesium oxide to form a resin salt having a decomposition point, adding a rubber solvent to said salt solution, and blending the resultant solution with a chloroprene polymer.

12. The process of making a solvent type adhesive solution which comprises reacting a heat-reactive butyl phenol-formaldehyde resin with sufficient magnesium oxide to form a butyl phenol-formaldehyde resin-magnesium oxide salt, and blending said salt with polychloroprene, said blend being provided with sufficient inert volatile organic solvent to form the adhesive solution.

References Cited in the file of this patent
UNITED STATES PATENTS

| | | |
|---|---|---|
| 1,146,300 | Aylsworth | July 13, 1915 |
| 2,323,130 | Harvey | July 29, 1943 |
| 2,401,987 | Taylor et al. | July 11, 1946 |
| 2,430,987 | Lindner et al. | Nov. 18, 1947 |